Feb. 5, 1946.  J. D. WALKER  2,394,413
SEWAGE TREATMENT
Filed Aug. 11, 1942   3 Sheets-Sheet 1
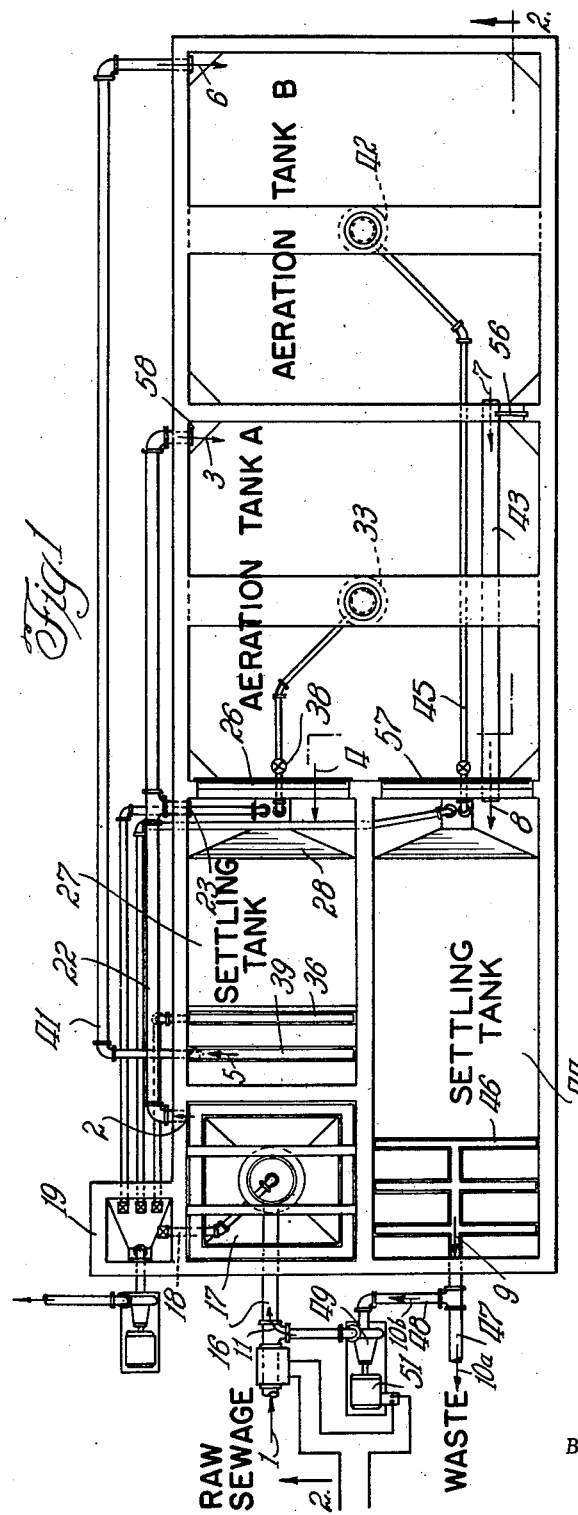
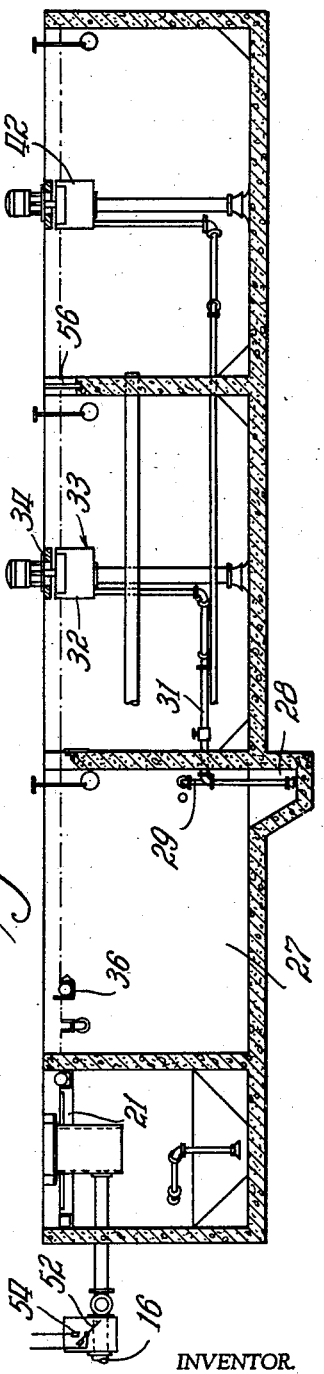
INVENTOR.
James D. Walker
BY Mann, Brown &c.
Att'ys.

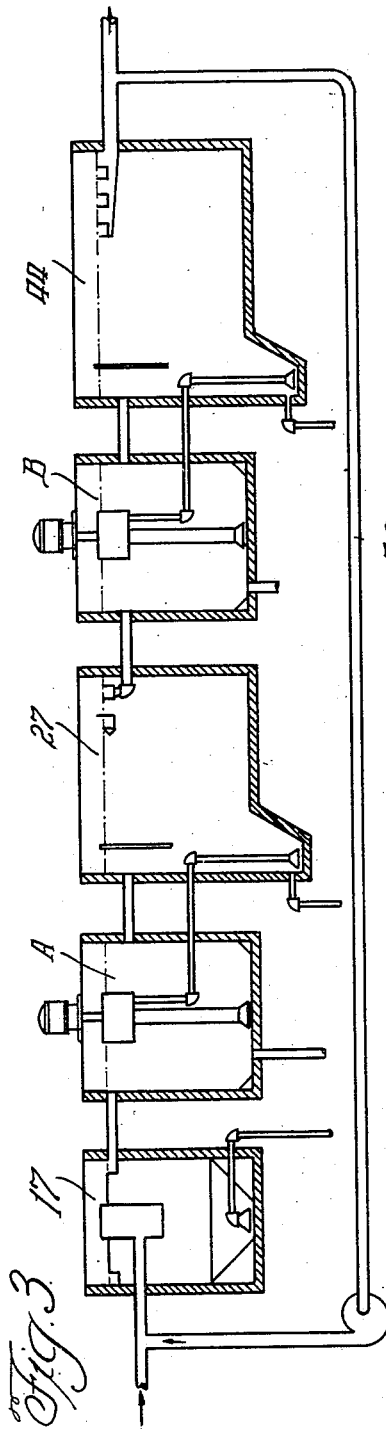
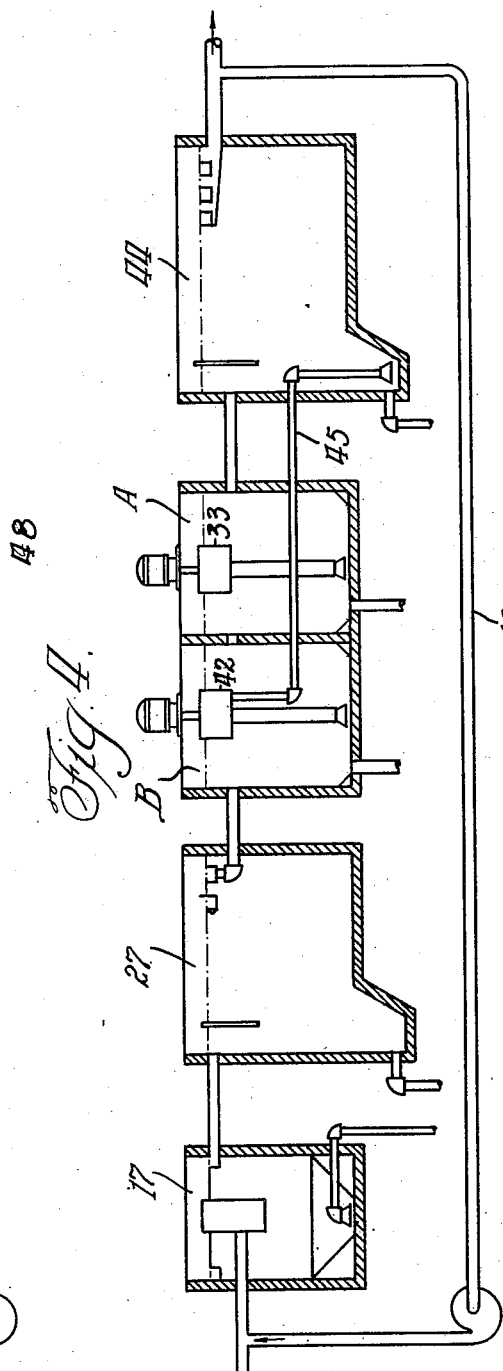

Feb. 5, 1946.    J. D. WALKER    2,394,413
SEWAGE TREATMENT
Filed Aug. 11, 1942    3 Sheets-Sheet 3
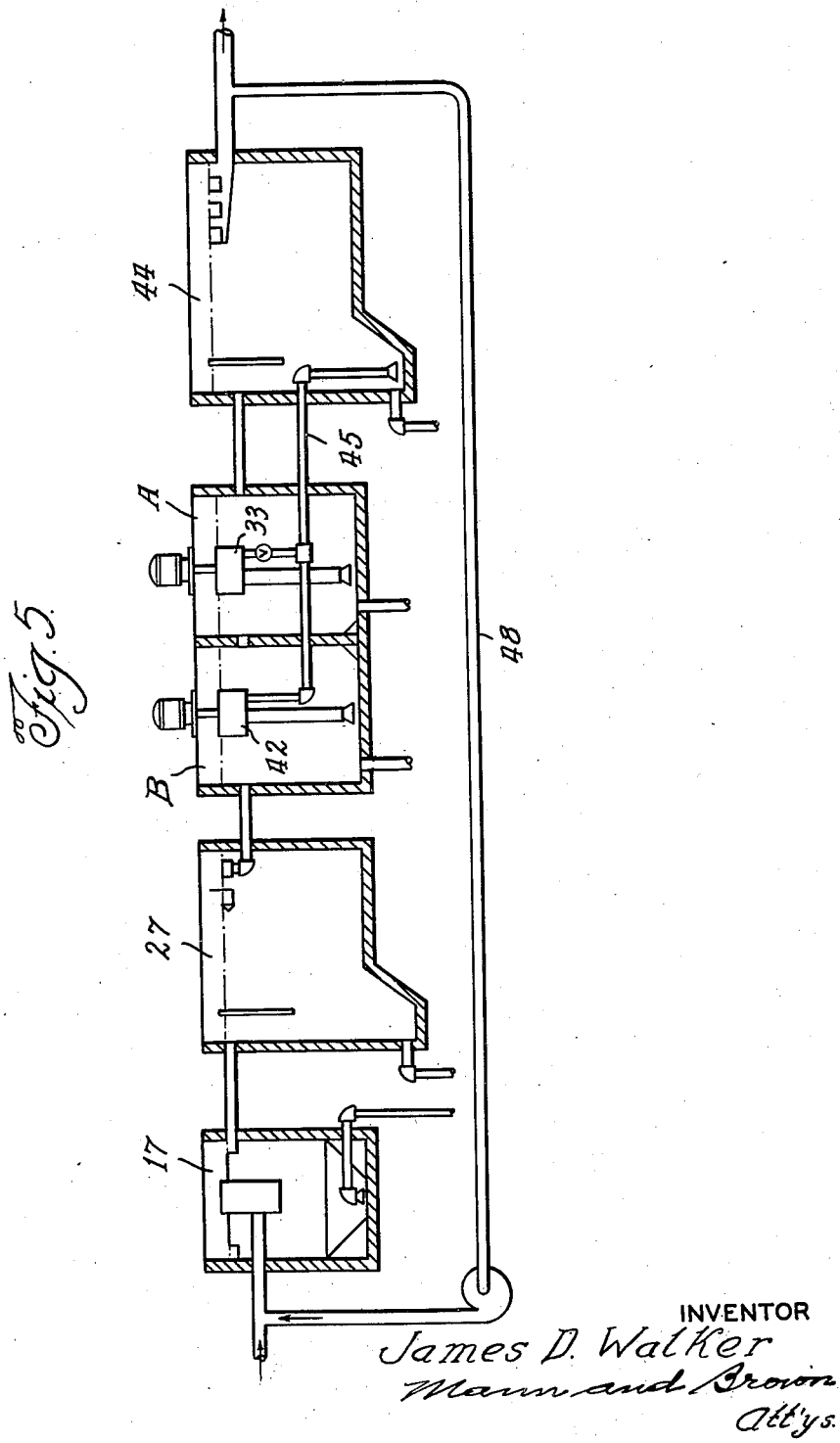
INVENTOR
James D. Walker
Mann and Brown
Att'ys.

Patented Feb. 5, 1946

2,394,413

UNITED STATES PATENT OFFICE 2,394,413

SEWAGE TREATMENT

James D. Walker, Aurora, Ill., assignor to The American Well Works, a corporation of Illinois Application August 11, 1942, Serial No. 454,378

4 Claims. (Cl. 210—8)

In the treatment of sewage including industrial wastes, by the activated sludge process, sewage flows into a tank in which it is thoroughly aerated and mixed with sludge resulting from previous performance of the process, and from which it flows into a settling tank in which the solids settle to the bottom as sludge, leaving substantially clear and relatively pure water at the top. The effluent or clear liquid at the top is customarily disposed of, usually by flowing it into a stream or lake. A substantial portion of the sludge which settles at the bottom is returned to be mixed with the fresh sewage flowing into the aeration tank, this being the activated sludge by which the process gets its name. The remainder of the sludge is carried to a digester and ultimately disposed of.

In the aeration tank, the sewage is purified by the help of aerobic (oxygen-consuming) bacteria so that the extremely fine solids and dissolved matter contained in the sewage liquids are converted to such a form that they will settle out as sludge in the settling tank. The useful bacteria are colonized on the activated sludge, and hence the return of the sludge acts to "seed" the raw sewage with a supply of the bacteria. The oxygen and aerobic bacteria in the aeration tank also prevent the sewage, while it remains therein, from becoming putrified or septic.

In the present invention, considerably improved results are accomplished as compared to the ordinary activated sludge treatment by returning effluent (clarified liquid) from the final settling tank to the inflow conduit of the system, especially if a preliminary settling tank is provided before the first stage of aeration. This effluent return assures an adequate flow through the preliminary settling tank so that there is no danger of sewage remaining therein long enough to become septic as it sometimes does when the volume of sewage input is exceptionally low. This return effluent also tends to dilute any shock loads which might otherwise upset the activated sludge treatment, and to supply oxygen and enzymes.

Additional advantages and objects of the invention will be apparent from the following description and from the drawings, in which Fig. 1 is a plan view of apparatus chosen for illustration of the invention;

Fig. 2 is a sectional view taken approximately on the irregular line 2—2 of Fig. 1;

Fig. 3 is a schematic flow diagram of the apparatus adjusted for performing the preferred process;

Fig. 4 is a schematic flow diagram of the apparatus shown in Figs. 1 and 2 adjusted for performing a conventional activated sludge process, but with optional recirculation of effluent; and Figure 5 is a schematic diagram of the apparatus shown in Figures 1 and 2 adjusted for performing an activated sludge process, with an optional alternative means for recirculation of sludge.

A preferred form of the invention has been chosen for illustration and description, in compliance with Sec. 4888 of the Revised Statutes, but persons skilled in the art will readily perceive other means using the invention for accomplishing the same results.

It is believed that the apparatus will be most easily understood by describing its operation, the individual parts thereof being for the most part well known in the sewage art. The flow of the liquid portion of the sewage has been indicated by arrows successively numbered from 1 to 11. Arrow numbered 1 indicates the entrance of the raw but preferably screened sewage into the system.

The sewage flows through an intake pipe 16 into a preliminary settling tank 17, the chief function of which is to remove the grit and other solids which are heavy enough to settle quickly. The settled solids flow through a pipe 18 into a sludge sump 19. The remaining liquor flows from the surface into a trough 21 and, as indicated by arrow 2, flows into pipe 22. Normally, the shear gate 23 is closed so that this liquor flows as indicated by arrows 3 into aerating tank A. From the aerating tank, the liquor flows over a lowered weir 26 into a settling tank 27. This tank is large enough with respect to the volume of flow of sewage so that the retention period is long enough to permit settling of nearly all of the settleable solids. These solids are scraped by a conventional collector into a sludge hopper 28. The sludge from this hopper flows partly through pipe 29 to sludge sump 19, and partly through pipe 31 to launder 32 of aerating pump assembly 33. This assembly draws in surface water from the contents of aerating tank A, mixes it with air and the return sludge from pipe 31, breaks up the air into very fine bubbles and discharges the mixture at 34 where it sweeps radially across the tank in all directions, thus assuring uniformity of mixture throughout the tank and agitating the liquor enough to produce flocculation of the extremely fine solids suspended in the liquor.

This unit may conveniently be that disclosed in my prior Patent 2,082,759, or either of those disclosed in my co-pending applications, Serial Numbers 265,646 and 317,371, the disclosure of each of which is hereby made a part hereof by reference. As a matter of fact, any other aerating and agitating apparatus including diffusion plates, could be used in both of the aeration tanks of this invention, although the aerating pump type indicated in my prior patent and applications has proved to be more efficient.

One advantage of the type of aerating apparatus indicated at 33 is that it produces very fine bubbles together with the agitation of the lower strata which has been found to be exceptionally efficient in the use of air and in flocculation of the solids. It is also a vital key to the separation of grease by flotation. To this end, a ring may be placed around the unit 33 at the surface to prevent the surface waters being drawn into the unit 33, if desired. It has been found, however, that with several inches of communication at and below the surface between the aeration tank A and the settling tank 27, the surface restrainer is not essential for fairly good grease-removing results. Assuming that the bubbles are ultra-fine as disclosed in my co-pending application, Serial Number 317,371, these extremely fine bubbles stay in the liquor as it flows into the tank 27 and floats the grease at that point. The resulting grease-bearing froth flows into skimming trough 36 from which it flows into the sump. In rare instances, when the grease content of sewage or other waste is unusually high, the grease will tend to coat the return sludge particles and prevent them from absorbing the oxygen necessary to maintain them in a satisfactory condition. With such a heavy grease load, it is desirable to cease the return of sludge until the grease condition has cleared up. In some particular plants, it might be desirable not to provide for return sludge to tank A at all. In most plants, it will be desirable to return sludge to tank A ordinarily, but to provide a valve 38 with which it can be shut off when desired. Of course when the sludge is returned, the volume which is returned may be controlled either by valve 38 or other known means. At present, it is believed that there is no need to shut off the return of sludge unless the grease content of the sewage admitted to tank A is equal to at least 40% of the weight of the total sludge from said sewage.

The clarified, or nearly clarified liquor from settling tank 27 flows into trough 39, and, as indicated by arrow 5, flows into a pipe 41 and through it into aeration tank B, as indicated by arrow 6. Aeration tank B, and the aerating apparatus 42 therein, may be identical with aeration tank A and aerating apparatus 33. From the aerating tank B, the treated sewage will flow through pipe 43 into final settling tank 44, as indicated by arrows 7 and 8, and return sludge from this tank will flow through pipe 45 back to aerator 42. It will thus be observed that substantially the only sludge with which aeration tank B starts its process is the sludge developed in this tank. In other words, nearly all (usually all) of the sludge developed in aeration tank A has been removed. Because it is not necessary to remove all of it, the settling tank 27 may be somewhat smaller than the settling tank 44 so as to provide less of a factor of safety, even though occasionally a few extremely fine suspended particles may remain in suspension. Even then the mixture in tank B is essentially a mixture of initially clear liquor from which the solids have been removed, together with a special type of activated sludge colonized with a strain of bacteria which is believed to be especially suitable for aiding nitration of the matter dissolved in the liquor, together with aiding flocculation of the particular type of solids resulting from this nitration. Of course, this theory is not a necessary part of the present application, and it is stated merely as a guide for one possible line of development of improvements, or variations on the present basic invention. In any event, whether a special strain is developed or not, it is clear that the sewage which has been treated in tank A is more effectively treated in tank B after the sludge flocculated in the tank A has been removed.

In like manner, the flocculation in aeration tank A is believed to take place more efficiently in the absence of sludge of the type used in tank B. Again, it is not known whether this is because of special bacterial strains developed in tank A, or because of special physical and chemical properties of its sludge. Also, it may be noted that this belief as to the desirability of having only tank A sludge in tank A has not yet been thoroughly verified, and it may subsequently be found that tank A may be seeded with return sludge from settling tank 44 provided that the resulting sludge is substantially removed before the sewage from tank A flows into tank B.

Settling tank 44 may be identical with settling tank 27 except that it need not have a scum trough since the floatable substances will have been removed in tank 27. Also, it is preferably longer than tank 27 so as to do a more thorough job of clarification than is necessary in tank 27. Each of the settling tanks 27 and 44 may either include a collector and the illustrated single hopper, or a series of hoppers into which the sludge settles by gravity.

As indicated by arrow 9, the clarified surface waters (effluent) from settling tank 44 flow through trough 46 and out of the system through waste pipe 47, as indicated by arrow 10—A. According to this invention, some of the effluent from settling tank 44 may flow through pipe 48, as indicated by arrow 10—B, to a pump 49 which will pump the effluent back to the inflow pipe 16.

There are several advantages of recirculating some of the effluent in the manner thus described. One is that in the case of sewages of the type which are hard to handle, the mere quantity of liquid dilutes the sewage so that it is more easily handled. Another advantage is that in periods of low volume of inflow of raw sewage, there is some danger that the sewage will remain in the settling tank 17, which is not aerated, long enough to become septic. Perhaps the most important advantage of all is that the effluent has a high content of dissolved oxygen and probably also has a fairly high content of enzymes produced by the aerobic bacteria. Both of these are helpful. The dissolved oxygen immediately supplies some of the oxygen needed by the incoming sewage to keep it from becoming septic, and both the oxygen and the enzymes precondition the sewage to get it closer to the conditions most favorable to the activated sludge process.

According to conditions in a particular sewage plant, practice may vary as to recirculation of the effluent. It may be controlled by hand and recirculated only when the recirculation seems necessary in the judgment of the attendant. On the other hand, it is preferably controlled automatically and recirculated whenever the inflow of raw sewage falls below a predetermined value. In some plants, the predetermined value will be set fairly low, but preferably not lower than the average rate of sewage inflow. In other plants, the predetermined value will be set high so that there will be recirculation at all times except under conditions of abnormal sewage inflow, as during storms. The latter setting is at present preferred because of the high value of the oxygen and enzyme content of the effluent. The cost of recirculation is fairly low because it is only necessary to raise the effluent about six inches at the most. The pump 49 will, of course, be driven by a motor 51. One type of motor is diagrammatically illustrated in Fig. 2 in which an impact vane 52 projects into the stream of sewage flowing into the inflow pipe 16 so that the position of this vane, which is biased toward a vertical position, is determined by the rate of flow through the inflow pipe 16. A contact 54 is closed by the vane 52 whenever it reaches a predetermined degree of steepness, thus starting the motor 51. Of course if a wet well is used from which the sewage is pumped to the system herein shown, the effluent may merely be bled to the wet well with a float control to maintain the predetermined level.

The amount of recirculation may be either adjusted or determined by design and will depend largely on the character of the inflow. A volume equal to 25% to 100% of the average inflow is believed desirable, although lower volumes, just enough to avoid septic conditions, would be useful and tests may show even higher volumes to be economical. As present, a volume at least sufficient to maintain average inflow is preferred.

There may be times when it will be desired to operate the plant as a straight activated sludge system without dividing the process into stages as heretofore described. At least, until the value of stages has been more thoroughly demonstrated and has become nationally known, it is desirable, from the sales standpoint, to have a plant which can be used efficiently for a straight activated sludge process. The plant of the present invention can be adapted for such a process very readily as illustrated in Fig. 4. For a straight activated sludge process, a little more thorough preliminary settling is preferred than would be afforded by the small settling tank 17 at the contemplated average loads. Accordingly, the effluent from tank 17 (or the entire raw sewage) would be carried to settling tank 27 except that in periods of light volumetric load, this tank could be by-passed. After preliminary settling, the sewage would be carried directly to aeration tank B where it would be mixed with return sludge from settling tank 44 and aerated. A gate would be closed over pipe 43 (Fig. 1) or one at each end thereof, and a surface port 56 between the two tanks A and B would be opened so that the mixture would flow from tank B to tank A and would be further aerated in tank A. A weir 57 on the wall between tank A and settling tank 27 would be raised to shut off flow between them. Of course, valve 38 would be closed so that there would be no return sludge to tank A. Alternatively, of course, a return sludge pipe could be provided between settling tank 44 and aeration unit 33 in tank A so that additional sludge could be added in tank A, if desired. From aerating tank A, the sewage would flow into settling tank 44, weir 57 being lowered. In its upper position, it shuts off this flow for the process previously described. Sludge collected in tank 44 and not returned through pipe 45 would flow to sludge sump 19 and from there be pumped to a digester. Likewise, effluent from tank 44 would be disposed of through waste pipe 47, or recirculated through recirculation pipe 48. The recirculation would be even more desirable in this instance than with the process previously described, especially if the settling tank 27 is not by-passed. In fact, in some plants, using a straight activated sludge treatment, recirculation of the effluent has already proved itself as being highly desirable, and in fact essential to the proper operation of the plant under some conditions.

To cause the sewage to flow from tank 17 to tank 27, instead of to aeration tank A, it is merely necessary to close shear gate 58 and open shear gate 23. Any suitable means may be provided for by-passing the tank 27 or the tank 17. With the recirculation of effluent herein shown, it is not believed that such by-passing will be necessary.

From the foregoing, it is seen that a method of treating sewage by an improved activated sludge process has been devised, one in which the process is divided into two stages with optimum conditions in each stage, the conditions in one stage being different from those in the other. Of course, more than two stages could be provided if any advantage is found to flow therefrom.

The present invention is not to be confused with mere pre-aeration which has been practiced heretofore. According to this prior practice, the sewage is pre-aerated for a very short time, perhaps ten minutes, before preliminary settling. In the settling which follows this, no more sludge is removed than would be removed if there had been no aeration, and only about 25% to 35% of the B. O. D. (biochemical oxygen demand) is removed. Longer period of pre-aeration, even without return of sludge, do provide some of the advantages of the present invention. To this extent, the present invention may be considered a continuation in part of my copending application, Serial Number 317,371, for in practicing that process with the long retention period inherent therein, it has been found that from 55% to 60% of the B. O. D. can be removed in the subsequent preliminary settling, prior to the beginning of the main activated sludge process. This advantage of greater removal was specifically mentioned in said application.

In practicing the present invention, about 75% of the B. O. D. is removed after treatment in tank A and before treatment in tank B. To produce the additional 15% removal as compared with the practice in accordance with my prior application, Ser. No. 317,371, it is not only necessary to return the sludge but also to increase the retention period. It is contemplated that the average retention period in the present invention will be from 90 to 120 minutes, whereas 40 minutes was sufficient in practicing the grease separation in accordance with my prior application, Ser. No. 317,371. To those skilled in the art, it will not seem that the cost of doubling or tripling the retention period is justified by merely raising the B. O. D. removal from 60% to 75% preliminary to the activated sludge treatment. Nevertheless, I have determined that the added cost of the increased retention period in tank A is more than justified because in addition to the greater removal of the B. O. D. the remaining sewage is much better prepared for the final stage of activated sludge, the nitration and reflocculation stage, than if this additional 15% had not been removed. Perhaps this is because the nitration specialists among the bacteria returned to tank B do not have to waste their time nitrating solids which would better be flocculated in tank A, and hence would devote their entire numbers to nitrating the dissolved matter. Again, it is noted that this theory is mentioned for only what value it may have. The invention is independent of the theory and the advantages of the invention have been proved.

The aeration units indicated are very efficient. Not only do they circulate and aerate the liquor with low power cost, but the lower liquor level in the aerator on the suction side of the pump makes possible the return of sludge by gravity from the settling tanks. Also the air is introduced as very fine bubbles which are further broken up so that the bubbles are so fine they stay in the liquor a long time to permit a relatively high percentage of the oxygen to be dissolved. The bubbles are much finer than those which would detach themselves from a porous diffusion plate and in fact, 90% of them are so fine that they will not rise through water at more than five inches per second. Of course without this type of aeration, the sludge could be returned by separate pumps.

The sludge returned to tank A should be about 25% of the average daily inflow, or more, and the sludge returned to tank B should be about 50% of the average daily inflow. Of course, the volume of return in each plant may be determined by experience to give the best operating characteristics of that plant.

Considerable saving in volumetric capacity of the system is effected by the present invention, especially in small sizes of plants where the factor of safety can be considerably reduced because of the high stability afforded by the present invention. The recirculation maintains all the sewage in the system in excellent condition so that any ordinary surge or shock loads are immediately largely absorbed and converted to a nearly average condition. Even exceptional surge or shock loads are rendered harmless by the combination of this effect and the staging effect which permits no more than a small percentage of any shock or surge to be passed to the second stage. Although moderate reductions in size are permitted by this invention even in average conditions, the added stability permits the total aeration tank volume to be reduced (in small plants where departures from average are most serious) by one-fifth to about one-half. For example, the average retention period now contemplated for aeration is 5 to 6 hours total (2½ hours in each tank). The total settling period is not increased being divided, however, to 15 minutes, 2 hrs. and 2½ hrs. in the successive settling tanks.

The term "sewage" used herein includes industrial wastes and any other liquors needing purifying, as well as municipal sewage.

I claim:

1. The method of treating sewage and the like which includes the steps of flowing the sewage into a first aeration tank, mixing it with activated sludge resulting from previous treatment of sewage by the method set forth herein, aerating the mixture in this tank, flowing the sewage from this tank into a first settling tank, settling sludge from the liquid portions of the sewage, flowing the effluent from the first settling tank to a second aeration tank, mixing it with activated sludge resulting from previous treatment of such effluent in said second aeration tank according to this method, aerating the mixture in the second aeration tank, passing the mixture into a second settling tank, allowing the solids to settle from the liquid therein, separately withdrawing the effluent and the settled solids from the second settling tank, returning some of the solids to the second aeration tank, and mixing a substantial portion of the effluent with the raw sewage about to be treated by the first aeration tank to dilute any shock loads in said raw sewage.

2. The method of treating sewage and the like which includes the steps of flowing raw sewage into a preliminary settling tank and then into an aeration tank, mixing it with activated sludge from a previous treatment of sewage by the same method, aerating the mixture in the aeration tank, settling the solids from the liquid of the sewage, returning some of the solids to the aeration tank, and returning a substantial portion of the liquid effluent from the first settling after said aeration directly to the preliminary settling tank.

3. The method of treating sewage and the like which includes the steps of mixing with the sewage approximately as it enters the treating plant an aerated liquor having oxygen therein to supply oxygen needs of the sewage to prevent its becoming septic, settling solids from the sewage flowing from the mixture, flowing the mixture from which the solids have been settled into an aeration tank, supplying activated sludge to the aeration tank, mixing and aerating the contents of the tank to flocculate the suspended and dissolved solids therein, settling the flocculated solids from the liquor of the resulting mixture, withdrawing the settled solids in the form of activated sludge, using some of said sludge to supply the previously mentioned activated sludge, withdrawing the resultant clarified liquor and using some of this liquor as a source of the previously mentioned aerated liquor.

4. Apparatus of treating sewage and the like which includes a preliminary settling tank, an aeration tank adapted to receive effluent from the settling tank, means for aerating sewage in said aeration tank, a final settling tank adapted to receive the products of the aeration tank, means for withdrawing sludge formed by the settling of solids in the final settling tank and returning parts of said sludge to the aeration tank, and means for separately withdrawing the clarified liquor from the final settling tank and mixing it with the sewage delivered to the plant at least as early in the treatment thereof as the flowing of the sewage into the preliminary settling tank, to supply the oxygen needs thereof to prevent the sewage from becoming septic.

JAMES D. WALKER.